United States Patent
Zhao

(10) Patent No.: US 9,296,312 B2
(45) Date of Patent: Mar. 29, 2016

(54) ELECTRIC VEHICLE DRIVE APPARATUS

(71) Applicant: Dezhou David Zhao, Windsor (CA)

(72) Inventor: Dezhou David Zhao, Windsor (CA)

(*) Notice: Subject to any disclaimer, the term of this patent is extended or adjusted under 35 U.S.C. 154(b) by 0 days.

(21) Appl. No.: 14/729,095

(22) Filed: Jun. 3, 2015

(65) Prior Publication Data
US 2015/0291060 A1    Oct. 15, 2015

Related U.S. Application Data

(63) Continuation of application No. 14/061,016, filed on Oct. 23, 2013, now Pat. No. 9,067,484.

(51) Int. Cl.
| | |
|---|---|
| *B60K 1/02* | (2006.01) |
| *B60L 15/20* | (2006.01) |
| *B60K 6/26* | (2007.10) |
| *B60L 11/18* | (2006.01) |
| *B60K 16/00* | (2006.01) |
| *B60R 25/30* | (2013.01) |
| *B60F 3/00* | (2006.01) |
| *B60L 11/12* | (2006.01) |
| *B60K 1/00* | (2006.01) |
| *H02K 7/00* | (2006.01) |
| *H02K 16/00* | (2006.01) |
| *H02K 7/116* | (2006.01) |

(52) U.S. Cl.
CPC .............. *B60L 15/20* (2013.01); *B60F 3/0007* (2013.01); *B60K 1/00* (2013.01); *B60K 1/02* (2013.01); *B60K 6/26* (2013.01); *B60K 16/00* (2013.01); *B60L 11/12* (2013.01); *B60L 11/18* (2013.01); *B60L 11/1861* (2013.01); *B60R 25/30* (2013.01); *H02K 7/006* (2013.01); *H02K 16/00* (2013.01); *B60K 2001/001* (2013.01); *B60K 2016/003* (2013.01); *B60K 2016/006* (2013.01); *H02K 7/1163* (2013.01); *Y10S 903/906* (2013.01)

(58) Field of Classification Search
CPC ................ B60K 6/442; B60K 7/0007; B60K 2007/0038; B60W 20/00; B60W 10/08; B60W 10/06; B60W 10/26; Y02T 10/6234
USPC .............. 180/65.1–65.31; 701/22, 36, 53–54, 701/301; 903/903–907
See application file for complete search history.

(56) References Cited

U.S. PATENT DOCUMENTS

| | | | | |
|---|---|---|---|---|
| 5,461,298 | A * | 10/1995 | Lara et al. | 320/109 |
| 5,962,139 | A * | 10/1999 | Hagiwara et al. | 428/413 |
| 6,205,379 | B1 * | 3/2001 | Morisawa et al. | 701/22 |
| 6,948,577 | B2 * | 9/2005 | Wakitani et al. | 180/65.1 |
| 6,991,051 | B2 * | 1/2006 | Swindell et al. | 180/65.1 |
| 7,135,786 | B1 * | 11/2006 | Deets | 290/55 |
| 7,990,004 | B2 * | 8/2011 | Aikawa et al. | 310/89 |
| 2008/0223633 | A1 * | 9/2008 | Kim | 180/65.2 |
| 2012/0249065 | A1 * | 10/2012 | Bissonette et al. | 320/109 |

* cited by examiner

*Primary Examiner* — John Walters
*Assistant Examiner* — James Triggs
(74) *Attorney, Agent, or Firm* — J. Gordon Lewis

(57) ABSTRACT

An electric vehicle may include a first drive axle to drive a first wheel of the electric vehicle, a first electric motor mounted directly on the first drive axle, a power supply such as a battery to power the first electric motor, and a controller to control the electric motor. The electric vehicle may include a second drive axle to drive a second wheel and a second electric motor mounted on the second drive axle. The electric motor may be only mounted on the first drive axle. The battery may be formed from an array of batteries.

20 Claims, 21 Drawing Sheets

SECTION A-A

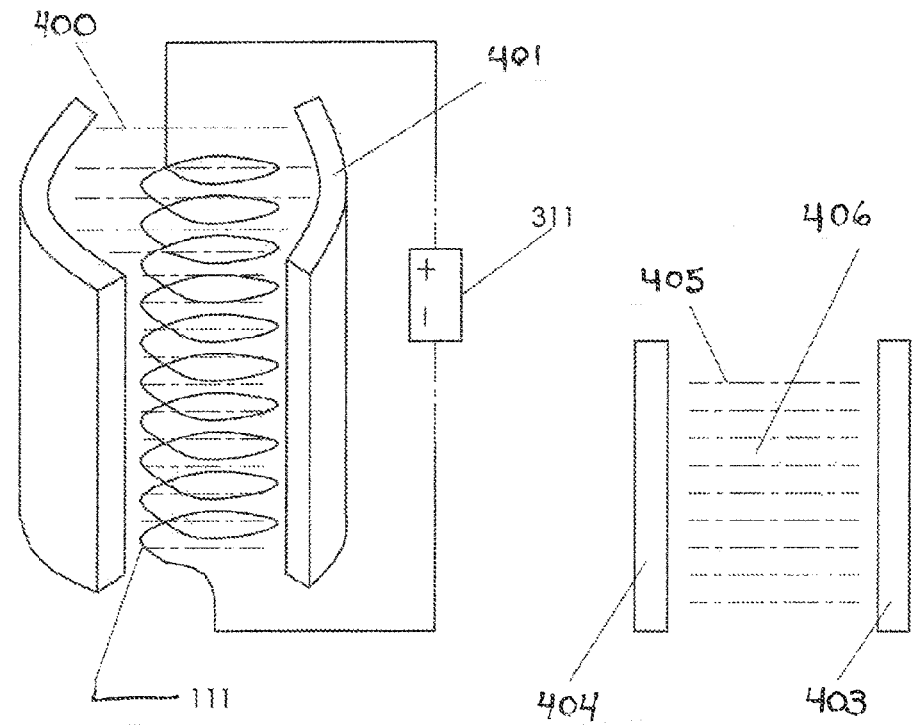
FIG. 20 A
FIG. 20 B
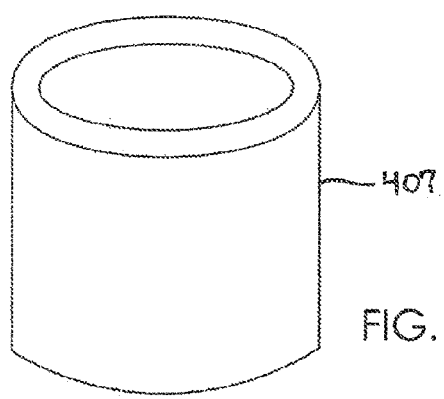
FIG. 20 C
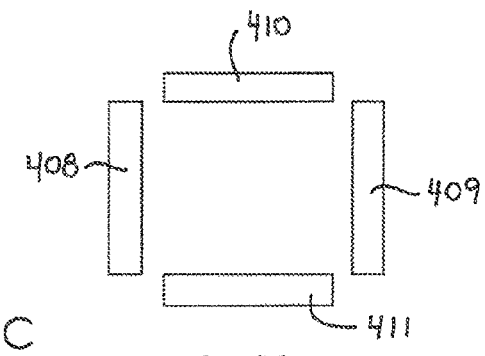
FIG. 20 D

ELECTRIC VEHICLE DRIVE APPARATUS

This application is a continuation of and claims priority to U.S. patent application Ser. No. 14/061,016 filed 23 Oct. 2013, entitled "Electric Vehicle Control Systems", now U.S. Pat. No. 9,067,484 B2.

FIELD OF THE INVENTION

The present invention relates to vehicles and more particularly to electric vehicles.

BACKGROUND

As the price of oil rises, the price of gasoline, diesel and other fuels, and the price to operate traditional vehicles increase. Furthermore, the traditional vehicles which operate based upon gasoline and other fuels, have undesirable environmental consequences. Electric vehicles provide a valuable alternative to the traditional vehicle.

SUMMARY

An electric vehicle may include a first drive axle to drive a first wheel of the electric vehicle, a first electric motor mounted directly on the first drive axle, a power supply such as a battery to power the first electric motor, and a controller to control the electric motor.

The electric vehicle may include a second drive axle to drive a second wheel and a second electric motor mounted on the second drive axle.

The electric motor may be only mounted on the first drive axle.

The electric vehicle may include multiple driving axles to drive the vehicle and electric motors mounted on those additional driving axles.

The electric vehicle may be a pure battery powered electric vehicle; or a hybrid type electric vehicle combined with fuel type generator/alternator and battery; or a pure fuel type electric vehicle without engine and transmission box inside.

The electric vehicle may convert vehicle vertical vibration mechanical energy into electricity.

The electric vehicle may be a remote control to drive the vehicle rather than human being inside to drive the vehicle.

The electric motor may be a disk type electric motor, or a non-disk type electric motor, or a combination of disk type electric motor and non-disk type electrical motor.

The battery may be formed from an array of batteries.

The battery may be interior to the electric vehicle.

The battery may be exterior to the electric vehicle.

BRIEF DESCRIPTION OF THE DRAWINGS

The, invention may be understood by reference to the following description taken in conjunction with the accompanying drawings, in which, like reference numerals identify like elements, in which:

FIG. 20A illustrates a schematic diagram including a magnetic field pole configuration operative to convert the vehicle vertical vibration mechanical energy into electrical energy and charge into battery by creating a magnetic field;

FIG. 20B illustrates a second magnetic field pole configuration; and

FIG. FIG. 20C and FIG. 20D illustrate alternative shapes of magnetic field poles.

DESCRIPTION

Figure 1:
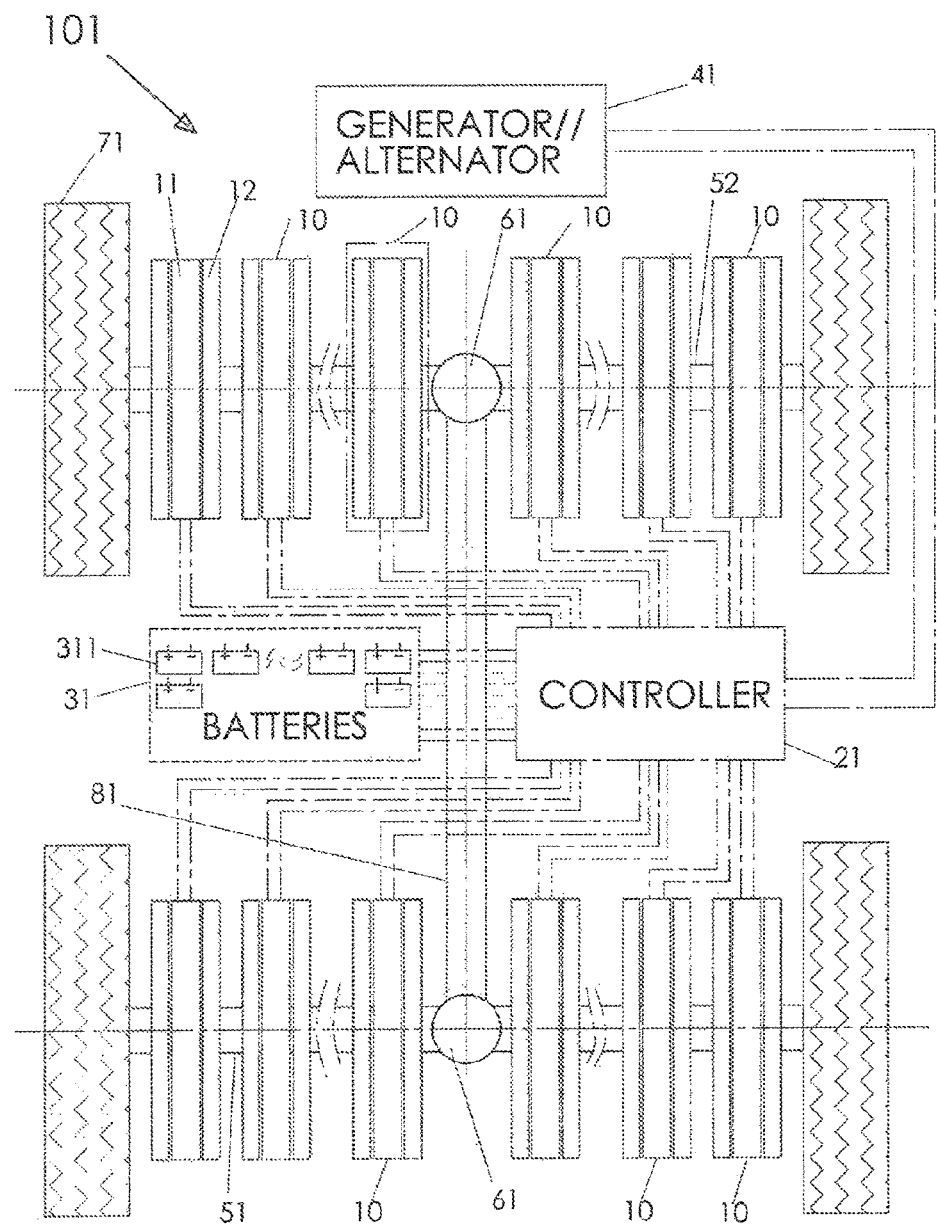
FIG. 1 illustrates a schematic drawing of the electric vehicle of the present invention.

FIG. 1 illustrates a schematic drawing for the electric vehicle 101 which may include a first driving axle 51 which may be connected to first wheels 71 and which may extend directly through a multitude of first electric motors 10. The electric motors 10 may be powered by an array of batteries 31 which may include a multitude of batteries 331 to supply electric power to the electric motors 10. The electric motors 10 may be controlled by a controller 21, and the driving axle 51 may be connected to a universal joint 61 which may be connected to a universal axle 81.

FIG. 1 additionally illustrates a second driving axle 52 which may be connected to the second wheels 71 and may be directly connected to a second electric motors 10.

Figure 2:
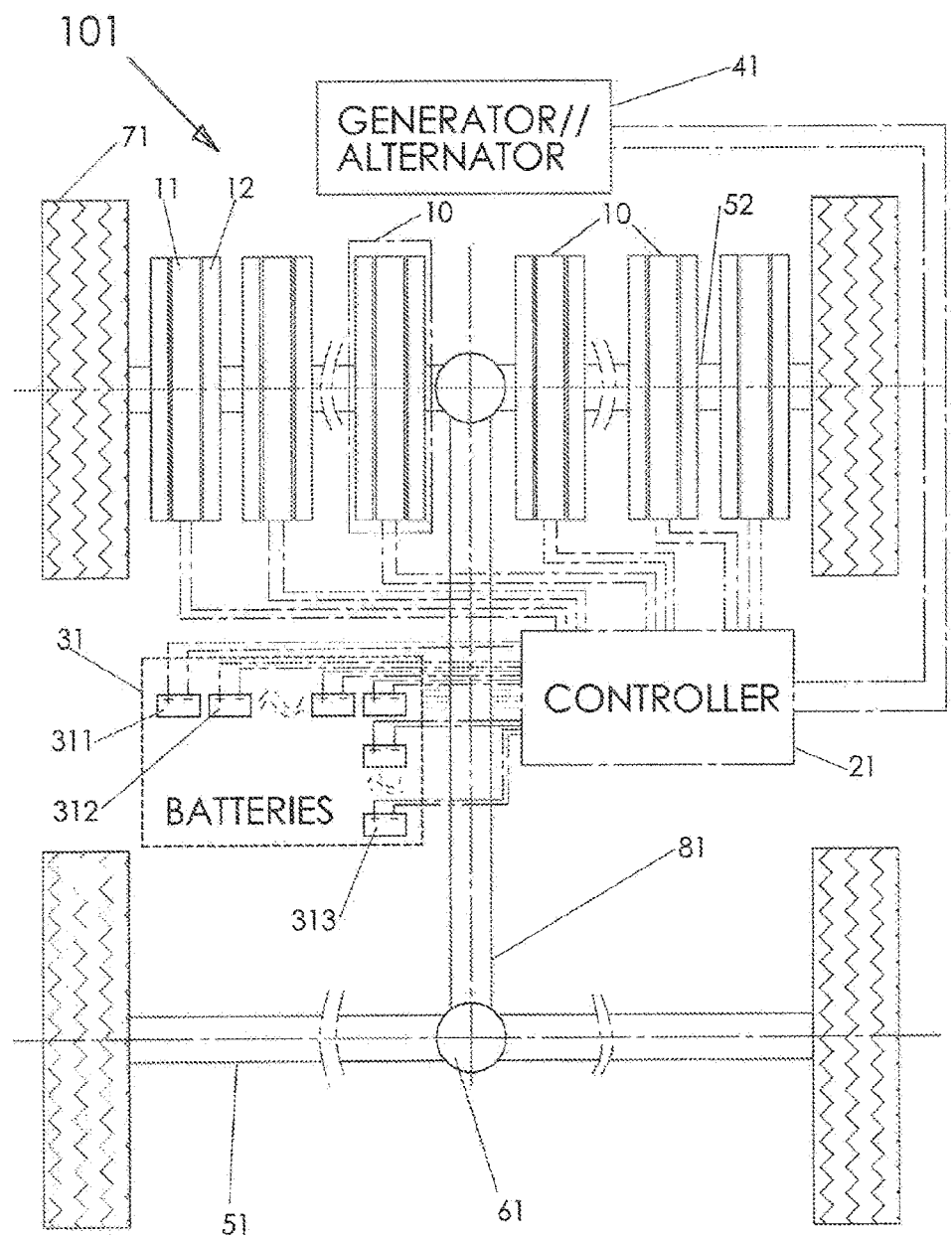
FIG. 2 illustrates a another schematic drawing of the electric vehicle of the present invention.

FIG. 2 illustrates a schematic drawing for the electric vehicle 101 and illustrates the electric motors 10 positioned only along a single driving axle 51 or axle 52. The present invention relates to an electric/smart vehicle 101 which may include a drive system 103 which may include a single or/and multiple electrical motors 10 which may be a Disk Type Motor (or called Flux, Axial Flux Motor or Pancake Motor) (see FIG. 5A, FIG. 5B, FIG. 5C, FIG. 5D, FIG. 8A, FIG. 8B and FIG. 9) or maybe a non-disk type motor (see FIG. 14A, FIG. 14B, FIG. 14C and FIG. 15A, FIG. 15B, FIG. 15C), or may be a combination of the Disk type and non-disk type motors (see FIG. 16A, FIG. 16B, FIG. 16C). These electric motors 10 for example the combination of disk type sand non-disc may be mounted on the same driving axle 51, or/and 52. (see FIG. 1 and FIG. 2). The electrical smart vehicle 101 has much higher energy usage efficiency than traditional vehicles.

Each electrical motor 10 may be connected to a single battery 311 separately or/and battery unit 31 which may include an array of batteries 311 which may be connected in series (if need to increase the torque of the motor 10 (see FIG. 19A)). The number of electrical motors 10 which may be needed to be energized by the power supply for example such as the number of batteries 311 in a vehicle 101 may depend on the driving requirements such as the maximum driving speed, driven force/torque, weights and loads, driving resistance, wind resistance, etc. of the vehicle. The electric vehicle 101 may include a motor controller 21 to control the number and type of electrical motors 10 which may be need to be connected with electrical power such as battery 311 or batteries 311 from the battery unit 31 in order to produce enough torque/turning force to drive the electric vehicle 101 and for example to control the frequency that the coil 111, 112, etc. may be energized with electrical power from the battery 311 which relates to the electrical motor turning speed in order to reach the driven force and the vehicle driven speed.

The controller 21 controls the frequency that the electric motor coils 111, 112, etc. is energized with electrical power which may be supplied from such as battery 311, and/or the generator/alternator 41 which may generate electrical power by the movement of the electric vehicle 101 or by normal fuel, and/or another power supply and to control the turning speed of the electric motor 10 to drive the vehicle. The controller 21 may control all electric motor coils 111, 112 of the electric motor 10 to distribute the same frequency of electrical power in order to control all of the electric motors 10 to have the same turning speed in order to drive the electric vehicle 101 smoothly.

The electrical motor 10 may also connect to a fuel generator/(or called alternator) 41 in the vehicle to become a kind of hybrid vehicle in order to have a longer driven distance in case the battery 331 is out of electrical power (dead).

The battery 311 may be a traditional battery including a lithium battery, or other batteries and may be charged by normal utility power supply, or by a solar or/and winded power charger that mounted on the vehicle, as disclosed for example, in U.S. Pat. No. 6,991,051 B2 and U.S. Pat. No. 7,135,786 B1, or by the heat inside the car which be converted to electricity (during the summer time), or by a wireless remote charging system, as disclosed for example, in U.S. Pat. No. 5,982,139 and U.S. Pat. No. 5,461,298.

If the vehicle needs more than four electrical motors 10, the electrical motor 10 may be positioned in the front (first) driven axle 51 and back (second) driven axle 52 in order to provide a four-wheel drive (see FIG. 1).

Of course, if there is sufficient space on the driven axle 51/52, all the electric motors 10 may be positioned only in the front axle 51 or only in the back axle 52 to have a front drive or back drive type of vehicle. (see FIG. 2).

Figure 3A:
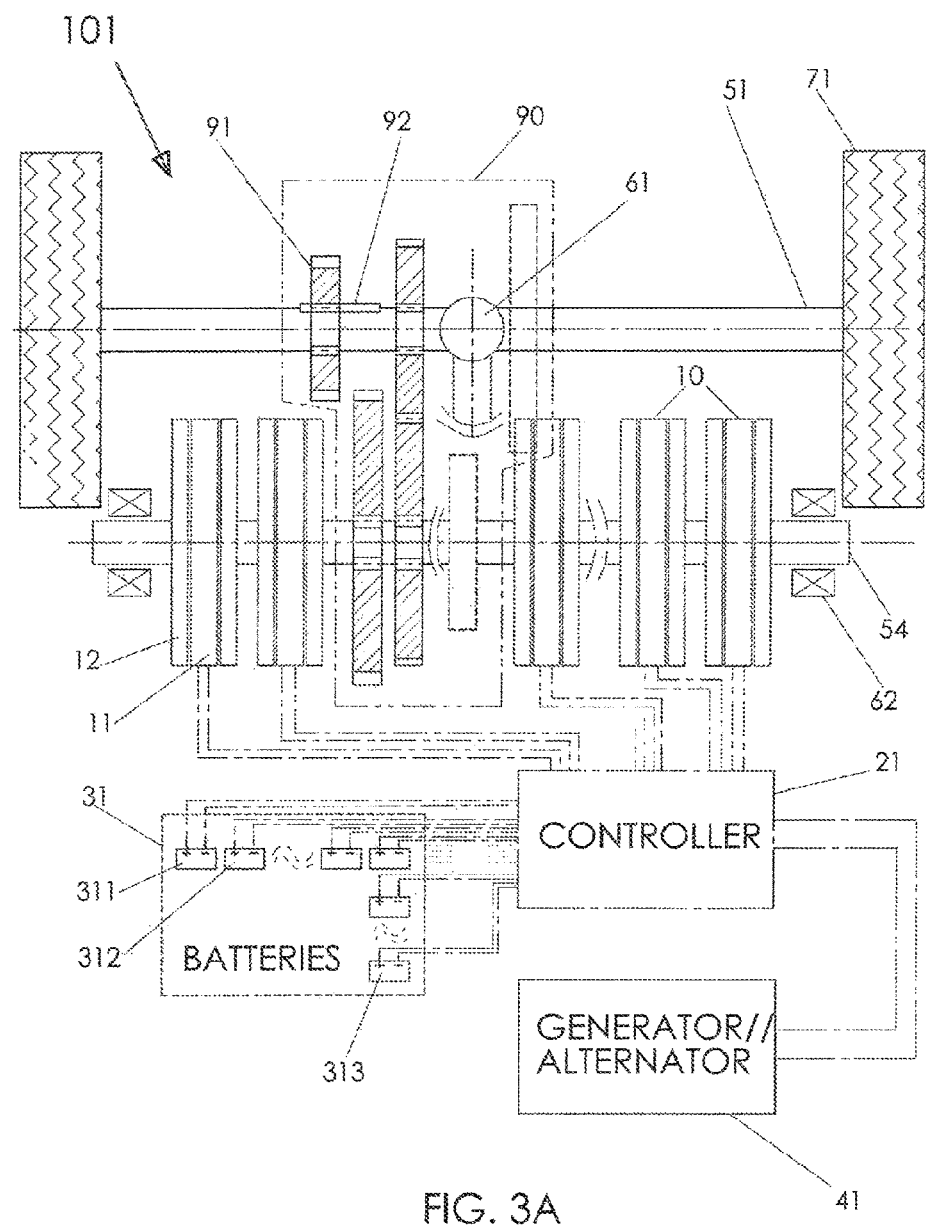
FIG. 3A illustrates another schematic drawing of the electric vehicle of the present invention.

FIG. 3A illustrates a schematic of an electric vehicle 101 which may have been insufficient clearance with the road surface for the electric motor 10 to be directly mounted on the driving axle 51. Since there is a clearance requirement at the bottom of vehicle, if the wheel 71 size is not large enough with respect to the electric motor 10 and/or if the bottom of electric motor 10 may be too close to the ground when the axle 51/52 are mounted with electrical motors 10, the axle 51/52 may be raised to a higher position in the vehicle and employ other normal traditional techniques such as gear transmission/driving system 90 to drive the axle 54 that mounted the wheels 71 in order to have a sufficient clearance. The transmission 90 may include a gear 91 and key 92 transfer the power from the electric motor 10 to the driving axle 51. (see FIG. 3A).

Figure 3B:
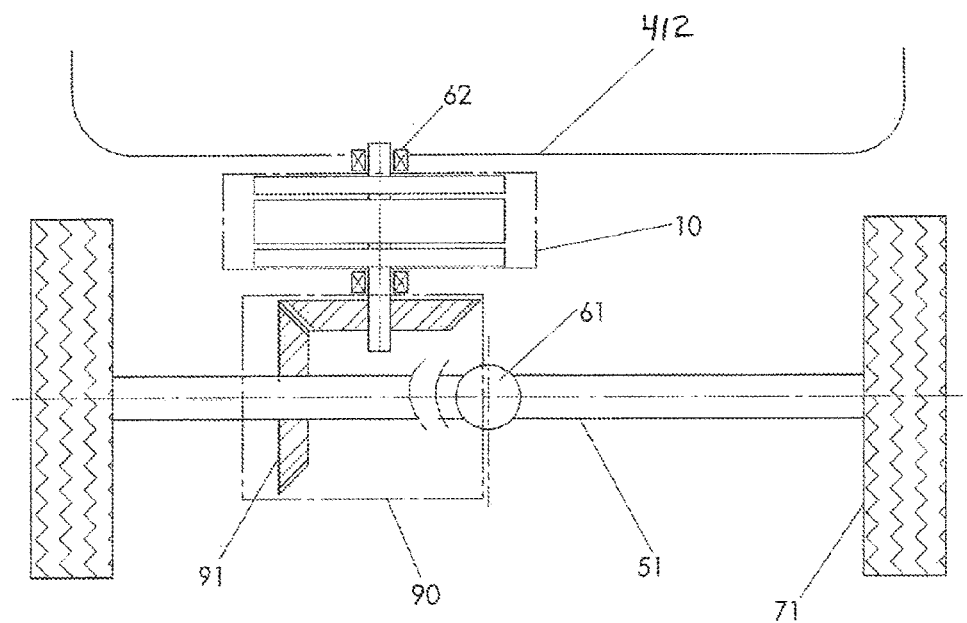
FIG. 3B illustrates another schematic drawing of the electric vehicle of the present invention.

FIG. 3B illustrates another schematic of an electric vehicle 101 which the electrical motor 10 may be mounted to let the electrical motor 10 turning direction parallel to the bottom of the vehicle or road surface, then traditional transmission method such as gear may be needed to convert the electrical motor turning direction to perpendicular to the bottom of the vehicle or road surface showing in FIG. 1, FIG. 2, FIG. 3A and FIG. 4.

Figure 4:
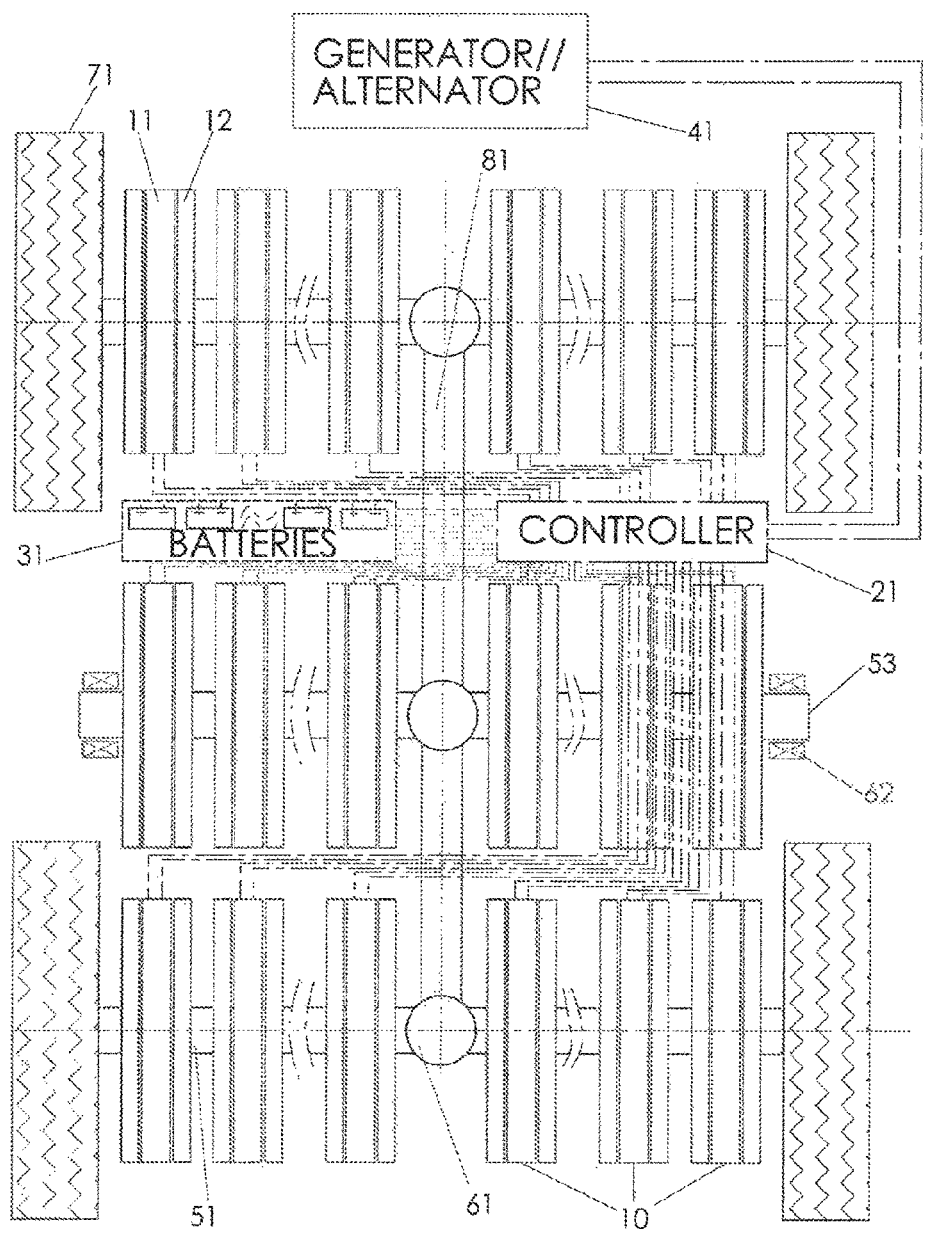
FIG. 4 illustrates another schematic drawing of the electric vehicle of the present invention.
Figure 13:
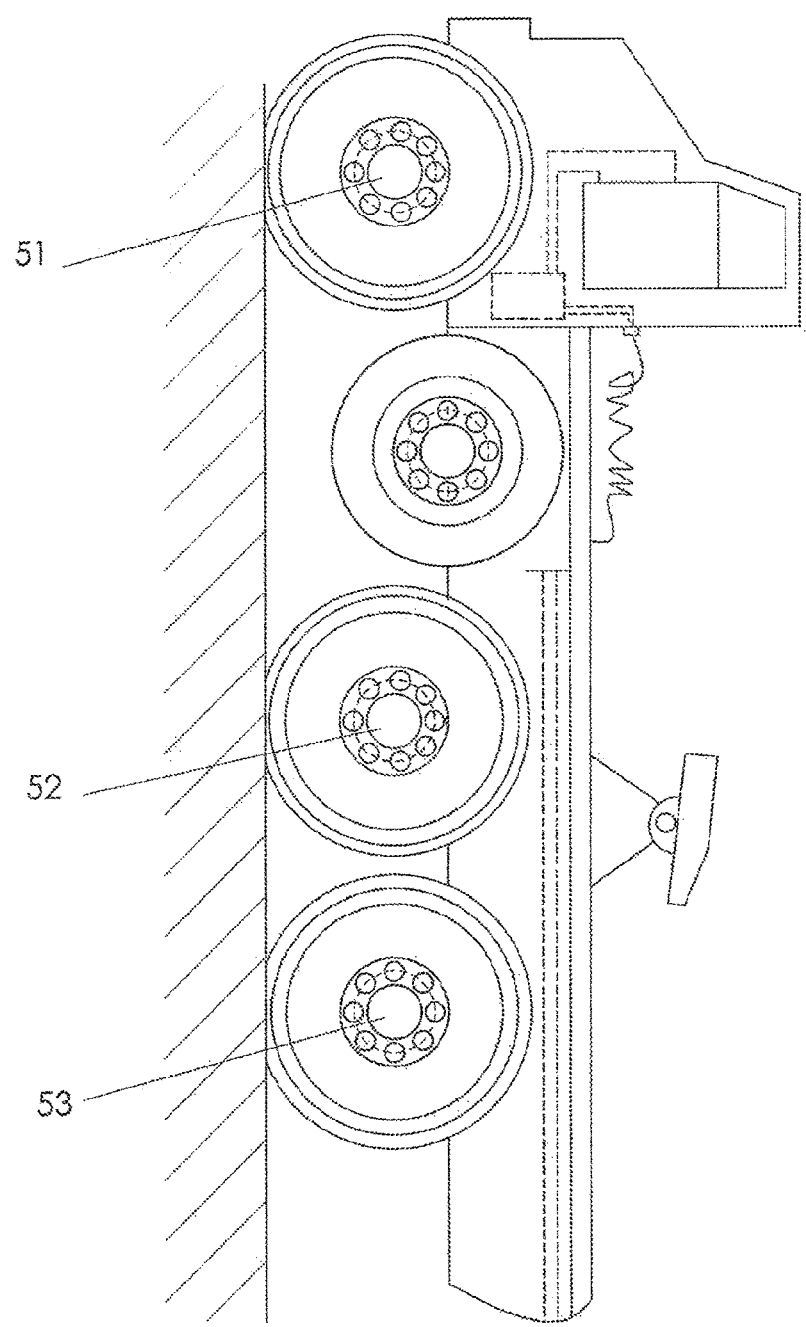
FIG. 13 illustrates a side view of the vehicle of the present invention.

If the driving force produced by all the electrical motors 10 on the two driving axle 51/52 is not sufficient to drive the electric vehicle 101, the present invention as shown in FIG. 4 may also use more than two axle driving system, with/without above electric motor 10 transmission system 90 method to have additional axle 53, additional electrical motors 10 and additional batteries 311 that can produce sufficient higher driven force/torque to drive the vehicle such as truck, train, or other transportation vehicles. (see FIG. 4). FIG. 13 illustrates a type of truck application, or alternatively, the present invention may just add more batteries 311 to increase the current in the electrical motor 10 to produce higher driving torque force before the electrical motor 10 reaches to its saturation situation (see FIG. 19A).

Unlike the traditional hybrid vehicle that has an engine inside, such electrical vehicle 101 may include a back-up fuel generator/alternator 41 which may be external to the electrical vehicle 101 as a kind of hybrid type vehicle to generate electricity for the electrical motors 10 when the batteries 311 are out of electrical power in order to extend the driving distance. (see FIG. 1, FIG. 2, FIG. 3A, FIG. 3B, FIG. 4).

Of course, the present invention may also just use a external fuel generator/alternator 41 that can produce electrical power to connect the electrical motor 10 as the only power source to drive this electrical vehicle 101. Such electrical vehicle becomes a fuel driven type vehicle but still not like normal/traditional engine driven vehicle because there is no engine and transmission box inside. Such electrical vehicle may have higher energy efficiency comparing with normal engine driven vehicle.

In order to achieve higher driven torque/force, the present invention may either use additional electrical motors 10 and batteries 311 and/or additional driving axle 50 as mentioned above. The present invention may just use more batteries 311, and the present invention may allow all of the motors 10 to have higher voltage (such as serial connection of two and/or more batteries 311) in order to produce higher current and additional Ampere-turns in the electric motor 10 that can generate more motor turning driving torque/force that need to drive the electrical vehicle 101 as long as the electric motor 10 hasn't reached its saturation point. (see FIG. 19A).

Figure 19:
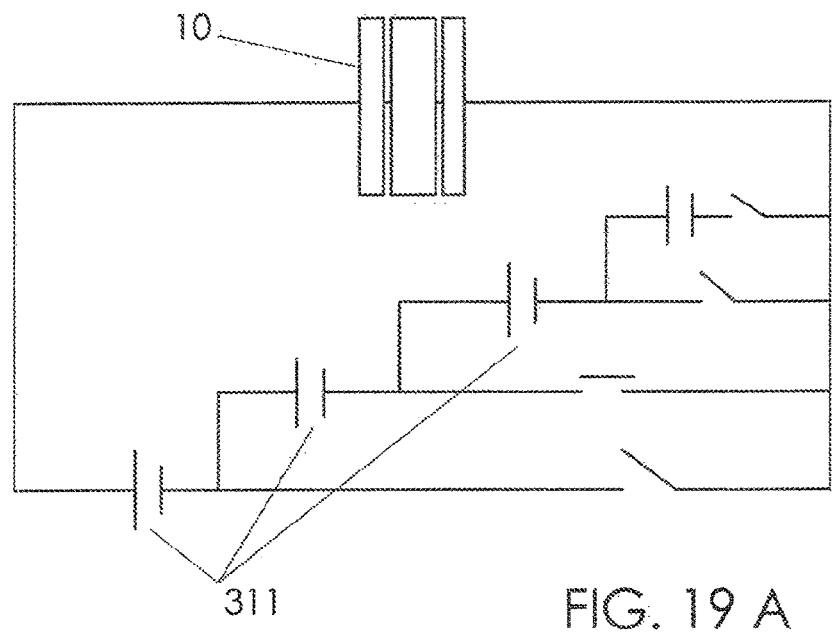
FIG. 19A illustrates a schematic diagram operative to provide higher driving force by connecting additional batteries.
FIG. 19B illustrates a schematic diagram operative to change the current inside the electrical motor, which may change the electrical motor turning force by change the resistance in the circuit.
Figure 19:
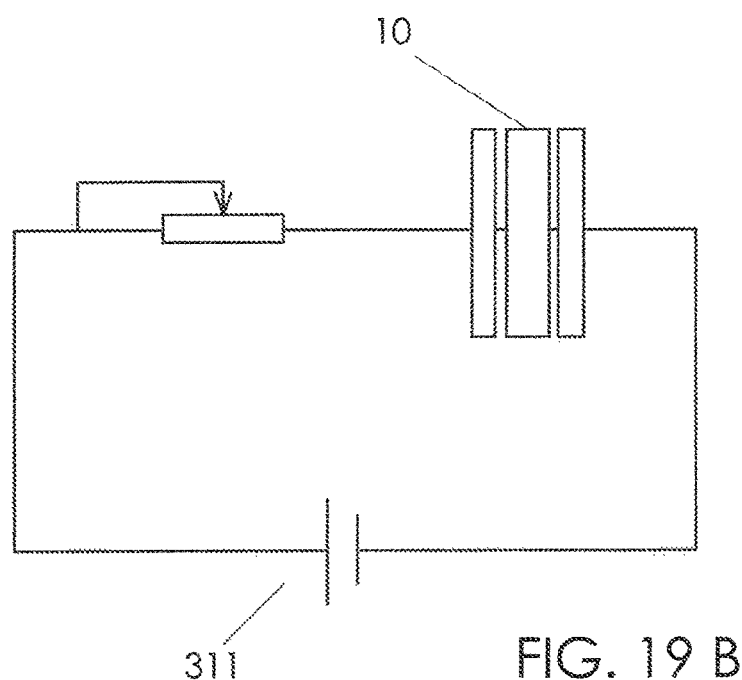

FIG. 19B illustrates another way of changing the current of electrical motor 10 by changing the resistance in order to change the torque of motor. The present invention may be able to use only one electrical motor 10 to drive the vehicle if the electric vehicle 101 has enough energy battery, or other power source supply.

The electrical motor 10 as shown in FIG. 1, FIG. 2, FIG. 3A, FIG. 3B, and FIG. 4 may be a Disk Type Motor (or called Flux Motor, Pancake motor) (see FIG. 5A, FIG. 5B, FIG. 5C, FIG. 5D, FIG. 8A, FIG. 8B and FIG. 9), or the electric motor 10 may be a non-disk type motor, especially those brushless motor such as capacitor brushless type motor (see FIG. 14A, FIG. 14B, FIG. 14C and FIG. 15A, FIG. 15B, FIG. 15C), or the electric motor 10 may be a mix of all kind of electrical motors (see FIG. 16A, FIG. 16B, FIG. 16C) as long as they can produce enough force to meet the driving requirements.

Figure 5:
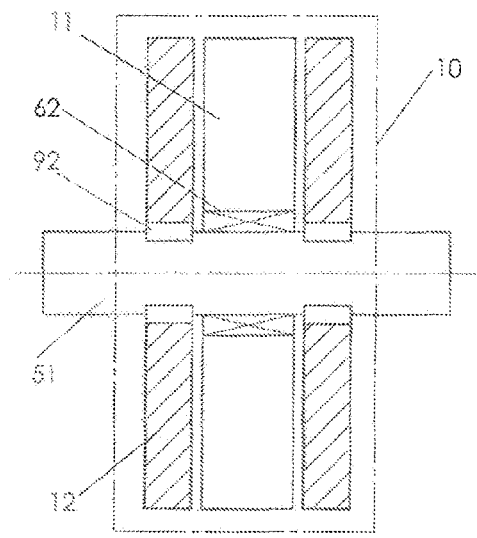
FIG. 5A illustrates a cross-sectional view of the electric motor of the present invention.
FIG. 5B illustrates a perspective view of the electric motor of the present invention of FIG. 5A.
FIG. 5C illustrates a side view of another electric motor of the present invention.
FIG. 5D illustrates a side view of the another electric motor of another present invention.
Figure 5:
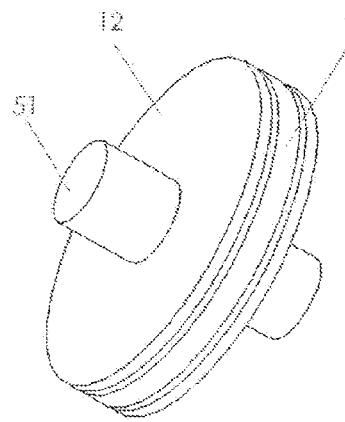
Figure 5:
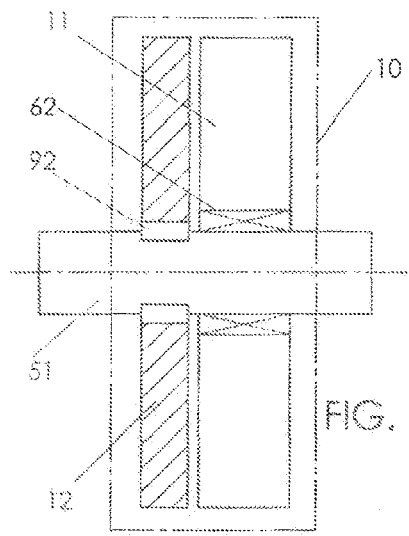
Figure 5:
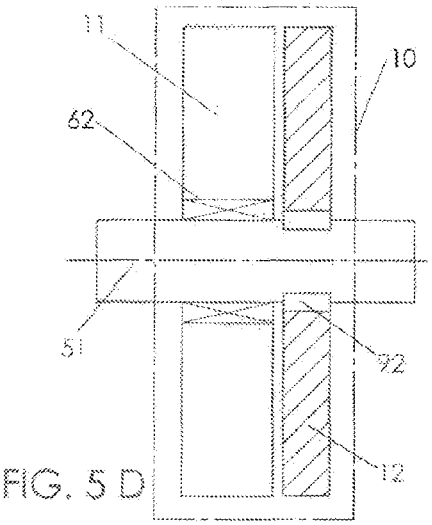

FIG. 5A shows two sides of rotor 12 disk type motor. FIG. 5A shows a motor 10 mounted on a driving axle 51 and illustrates a stator 11 which may be sandwiched between a pair of opposing rotors 12. FIG. 5 C and FIG. 5D show one side of rotor or stator of disk type motor.

Figure 8:
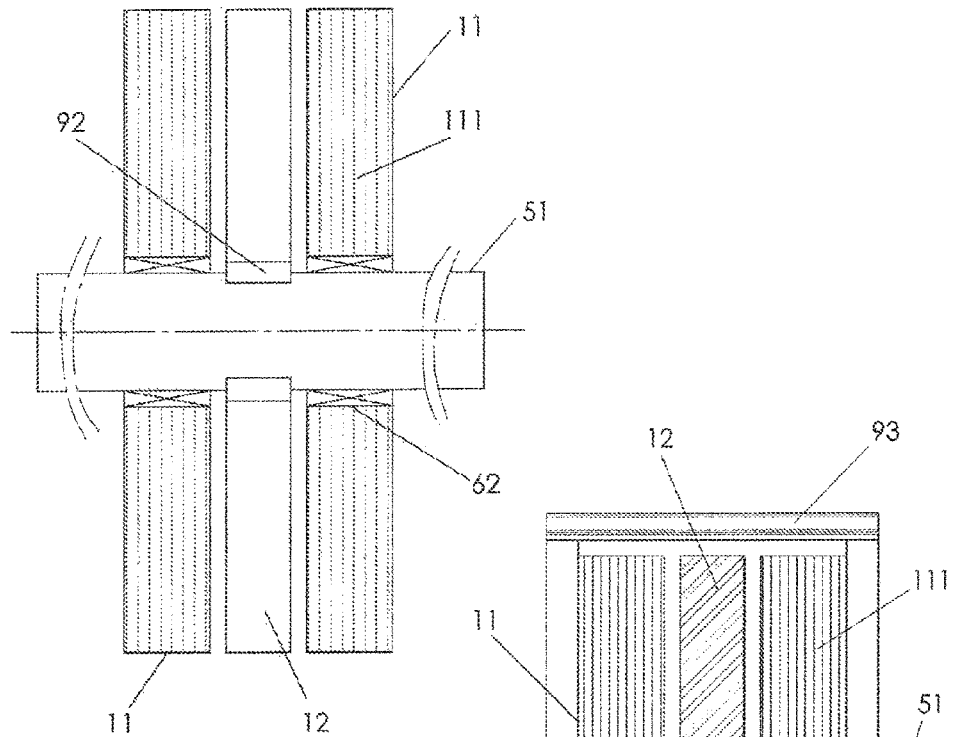
FIG. 8A illustrates a cross-sectional view of another schematic drawing of the electric motor of the present invention.
FIG. 8B illustrates a cross-sectional view of another schematic drawing with a motor sealing cover of the electrical motor of the present invention.
Figure 8:
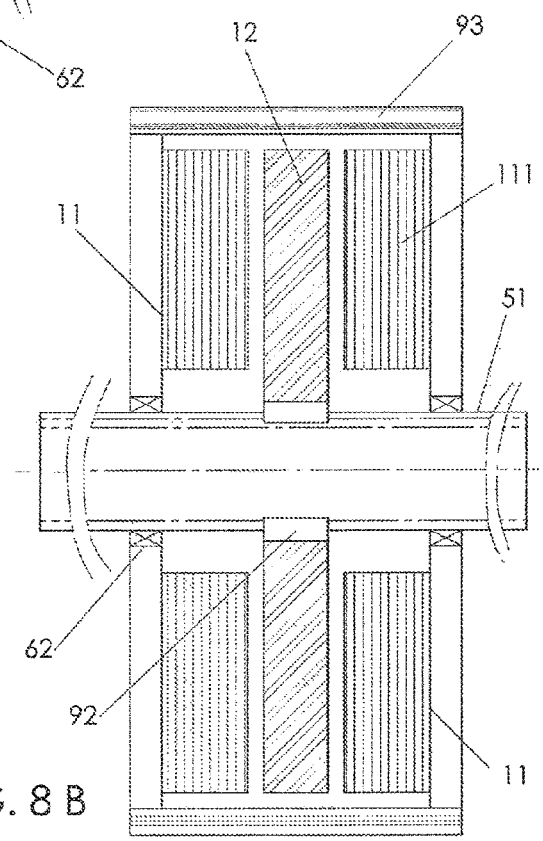

FIG. 8A shows two sides of stator disk type motor, and illustrates a rotor 12 which may be sandwiched between a pair of stators 11. FIG. 8B shows a motor with a sealing cover (i.e., "dirty cover") 93 which, in combination with stators 11 enclose the rotor 12 from ambient dirt.

The electrical motor may include a seal cover 93 (FIG. 8B shows one way of sealing, seal each electrical motor separately, or seal all the electrical motors on the same axle together) to protect the electrical motor 10 to prevent the dust, dirty, water or others that goes into the electrical motor 10 and damage the electrical motor 10. The seal cover 93 may be positioned over the stator 11 and covers the coil 111. FIG. 8A, FIG. 8B additionally illustrates the bearing 62 and the key 92.

The coil 111, 112, 113, 114 wire of the electrical motor 10 may be a magnet wire such as round, square or rectangle shape wire, or can be a super conductive wire (or called ultra conductive wire) to make this electrical vehicle 101 have better efficiency with respect to electrical power and higher electric efficiency.

Depending on the driving force requirements, the present invention may also use mechanical, hydraulic, pneumatic, electrical or/and combined all devices to move the rotor away or close to stator along the shaft in order to provide versatility for the disk type electric motor 10.

The electrical motor 10 driving invention may be used on all kind of transportation vehicles such as train, boat, ship, yacht, marine equipment, submarine, airplane, car, bus, truck, snowmobiles, ATV, RV, tractor, motorcycle, scooter as well as those off-highway construction mobile machinery, bicycle, bike, mowing machine, etc.

FIG. 17A, FIG. 17B, FIG. 17C, FIG. 17D shows a motorcycle application with one and/or two driven axles (when driven axle 51, 52 becomes short and electrical motor 10 quantity become less from FIG. 1).

Figure 17:
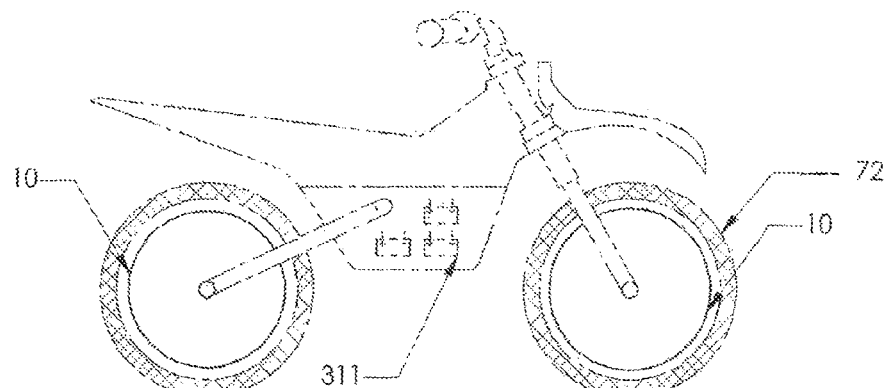
FIG. 17A illustrates a perspective view of another vehicle (e.g., a motorcycle) having the electrical motor of the present invention.
FIG. 17B illustrates a cross-sectional of the electrical motor and frame of the vehicle of the present invention of FIG. 17A.
FIG. 17C illustrates a cross-sectional of another electrical motor and frame of the vehicle of the present invention of FIG. 17A.
FIG. 17D illustrates a cross-sectional of another electrical motor and frame of the vehicle of the present invention of FIG. 17A.
Figure 17:
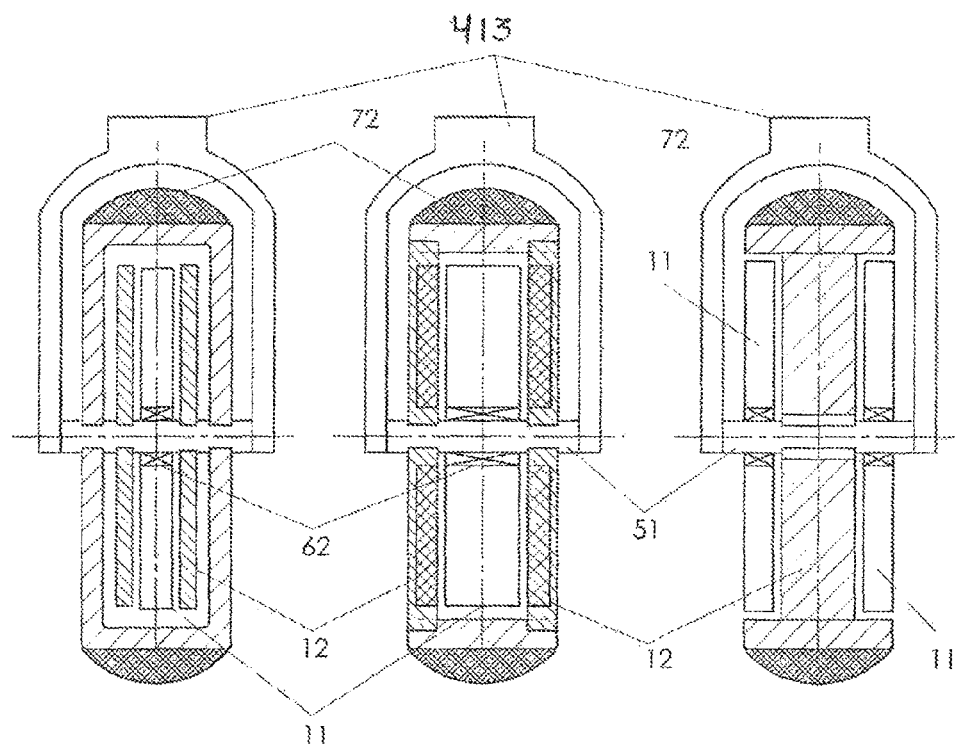

More particularly, FIG. 17A illustrates a side view of the motorcycle.

FIG. 17B illustrates the motorcycle frame, the wheel frame, the stator 11, the rotor 12, the bearing 62 and the driving axle 51.

FIG. 17C illustrates the motorcycle frame, the wheel frame, the stator 11, the rotor 12, the bearing 62 and the driving axle 51.

FIG. 17D illustrates another schematic of the motorcycle frame, the wheel frame, the stator 11, the rotor 12, the bearing 62 and the driving axle 51.

Figure 18:
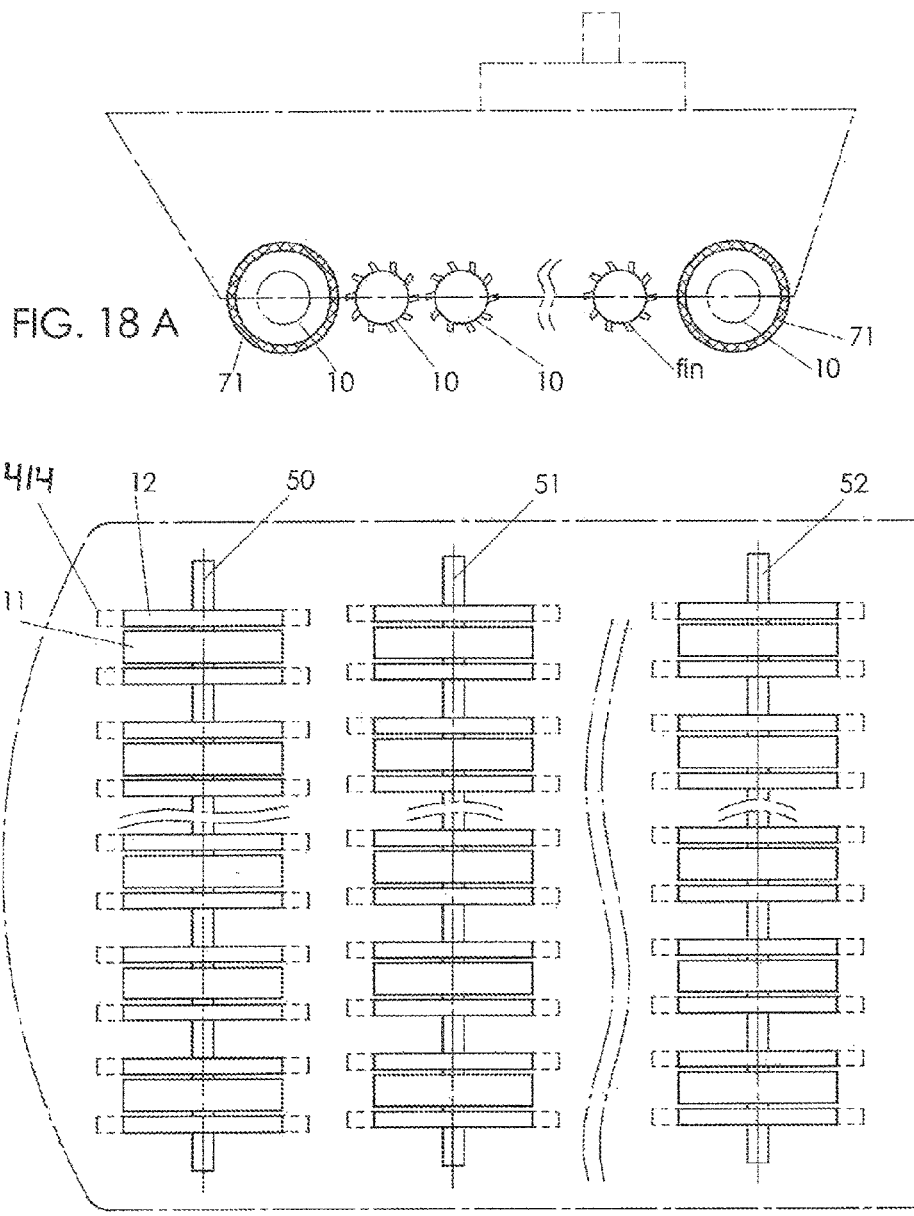
FIG. 18A illustrates a side view of another vehicle (e.g., amphibious/land vehicle) of the present invention.
FIG. 18B illustrates a bottom view of another vehicle (e.g., an amphibious vehicle) of the present invention.

FIG. 18B shows the bottom of boat application when there are more than one driving axles 50. The ship will be similar to the boat driving system. A fin may be mounted on the rotor 12 to form a force on the water to drive the boat, and at the boat application may include a wheel 71 to become amphibious application.

Additionally, FIG. 18A shows the present invention may be used on the ground as well as and/or in the water in order to provide a dual application vehicle on the ground and in the water.

The electrical motor 10 may be used as a driving force in the vehicle and may also be used as a braking force when braking or slow down the vehicle, and may convert the mechanical moving energy into electrical energy and charge the battery 311 in order to reduce the energy loss when braking or slowing down.

The electric vehicle 101 of the present invention may not include a ABS system in a vehicle because the electric vehicle 101 may simply use the reversing electrical motor force as the braking force by high frequency on/off as ABS type to replace the mechanical braking force and slow down the vehicle 101.

The electrical vehicle 101 of the present invention may include a remote control to drive the vehicle 101 rather than human being inside to drive the vehicle.

Based on driving requirement applications, the electric vehicle 101 of the present invention may not include the universal axle (or called differential system, or universal joints) 61, or the electric vehicle 101 may use a multiple of such differential universal axle system 61 when needed in such electrical vehicle.

Figure 12:
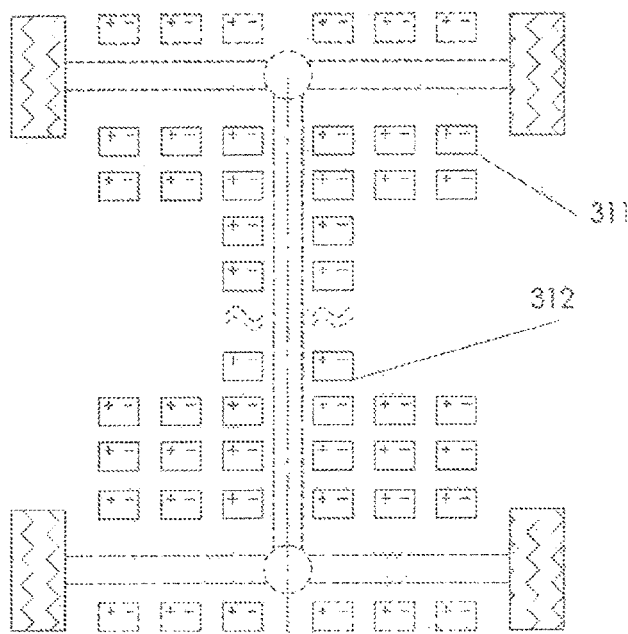
FIG. 12A illustrates an array of batteries inside the electric vehicle of the present invention.
FIG. 12B illustrates an array of batteries outside the electric vehicle of the present invention.
Figure 12:
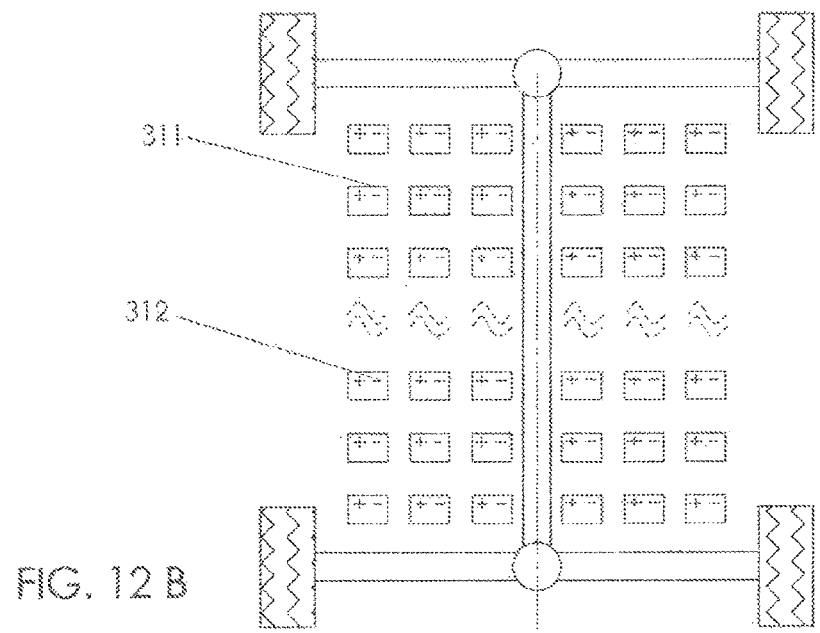

FIG. 12A shows one embodiment with batteries 311, 312 positioned inside the vehicle 101 for example under the seat of the vehicle, and/or under the hood.

FIG. 12B illustrates another embodiment with batteries 311, 312 positioned exterior the vehicle 101 for example on the bottom of the vehicle 101.

Figure 14A:
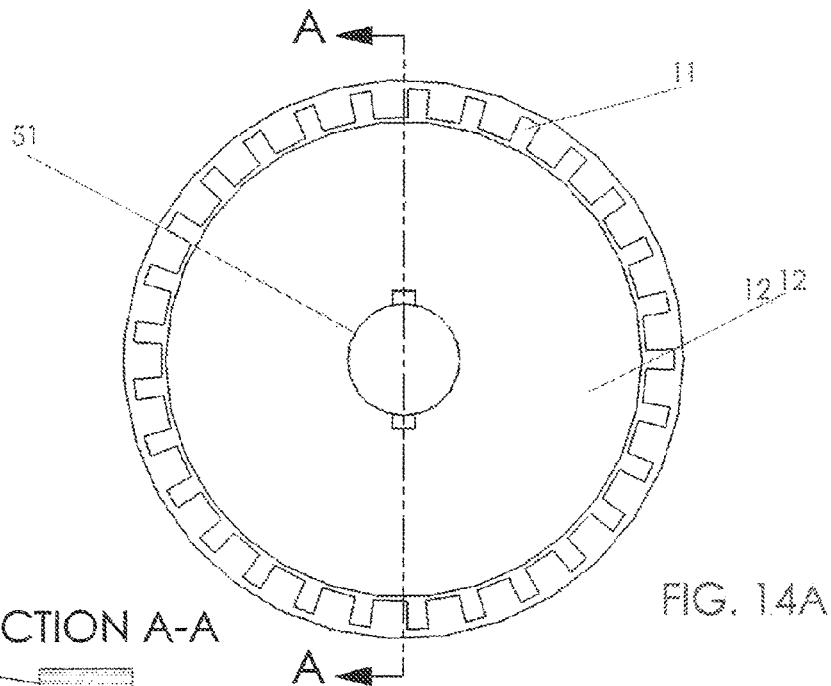
FIG. 14A illustrates a plan view of the rotor and stator of the present invention.

FIG. 14A illustrates a cross-sectional view of the stator 11 and rotor 12 of another schematic the electrical motor 10 of the present invention.

Figure 14B:
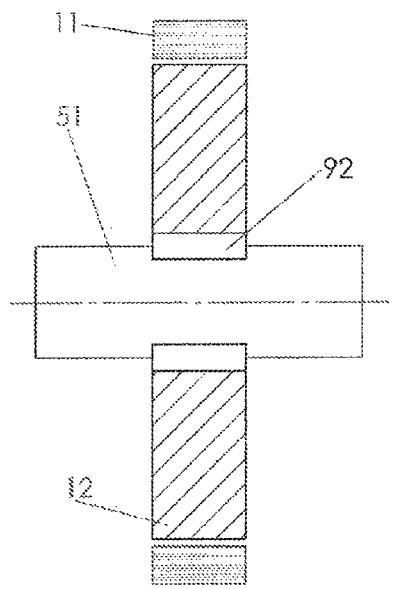
FIG. 14B illustrates a cross-sectional of the rotor and stator of the present invention.

FIG. 14B illustrates a side view of the stator 11, rotor 12, driving axle 51 and key 92 of the electrical motor 10 of the present invention.

Figure 14C:
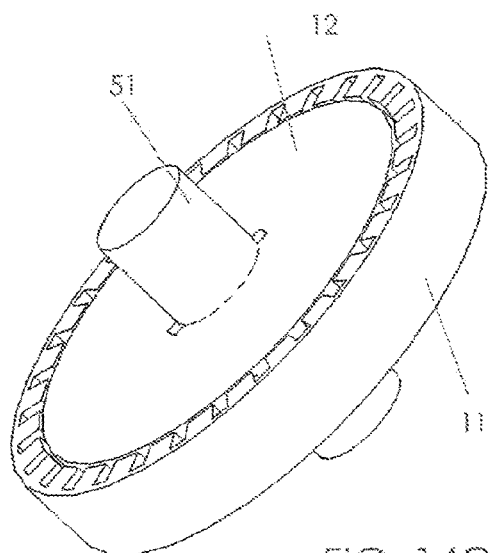
FIG. 14C illustrates a perspective view of the rotor and stator of the present invention.

FIG. 14C illustrates a perspective view of the stator 11 and rotor 12 which may be positioned on the driving axle 51 of the electrical motor 10 of the present invention.

Figure 15A:
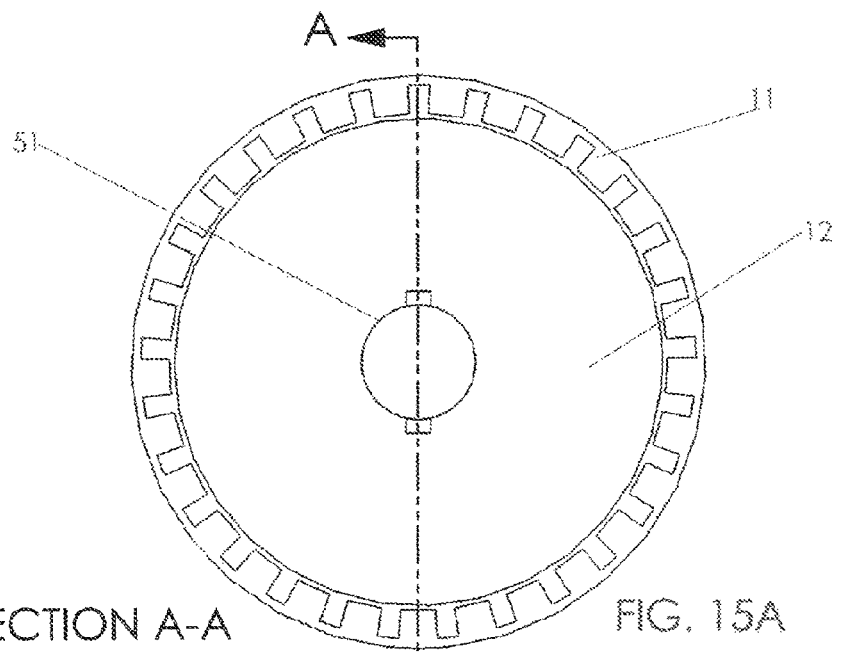
FIG. 15A illustrates a plan view of the stator and rotor of the electric motor of the present invention.

FIG. 15A illustrates a cross-sectional view of the stator 11 and rotor 12 of another schematic drawing of the electrical motor 10 of the present invention.

Figure 15B:
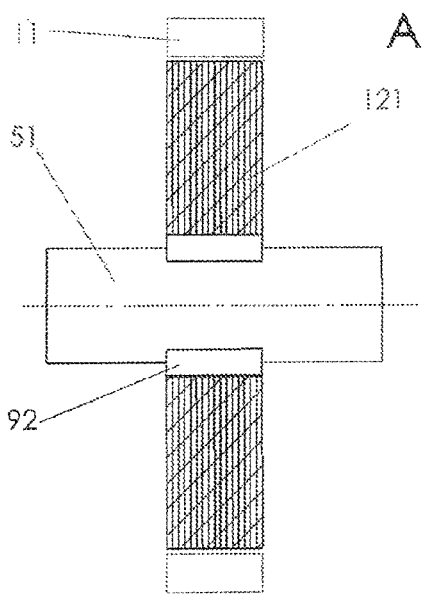
FIG. 15B illustrates a side cross-sectional view of the stator and rotor of the electric motor of the present invention.

FIG. 15B illustrates a side view of the stator 11, rotor 12, driving axle 51 and key 92 of the electrical motor 10 of the present invention.

Figure 15C:
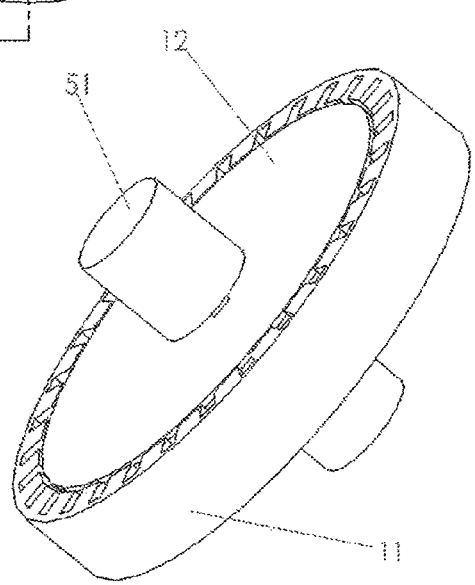
FIG. 15C illustrates a perspective view of the stator and rotor of the electric motor of the present invention.

FIG. 15C illustrates a perspective view of the stator 11 and rotor 12 which may be positioned on the driving axle 51 of the electrical motor 10 of the present invention.

Figure 16:
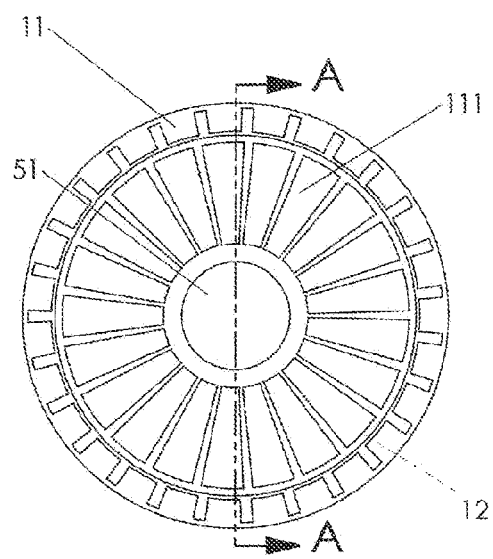
FIG. 16A illustrates a plan view of the stator and coil of the electrical motor of the present invention.
FIG. 16B illustrates a side cross-sectional view of the stator and rotor of the electrical motor of the present invention.
FIG. 16C illustrates a perspective view of the stator and coil of the electrical motor of the present invention.
Figure 16:
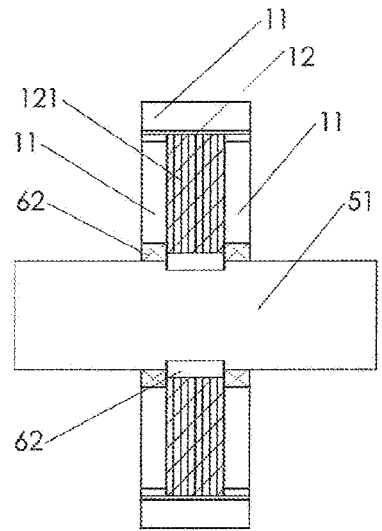
Figure 16:
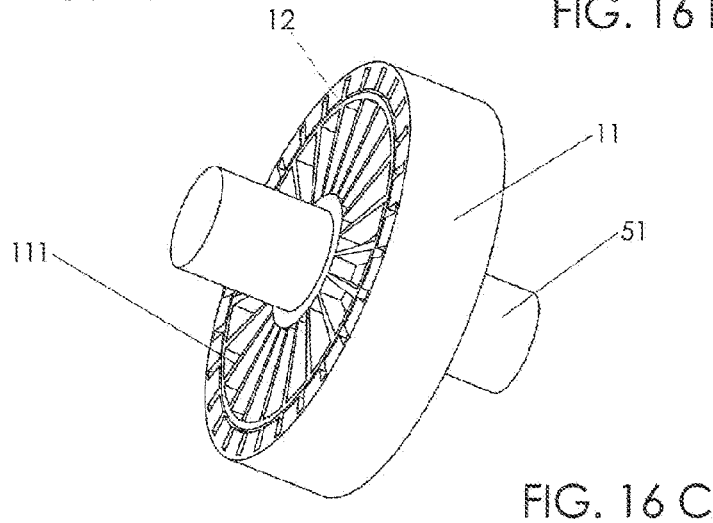

FIG. 16A illustrates a cross-sectional view of the stator 11 and coil 111 of another schematic drawing of the electrical motor 10 of the present invention.

FIG. 16B illustrates a side view of the stator 11, a rotor sheet 121, a bearing 62 for the driving axle 51 of the present invention.

FIG. 16C illustrates a perspective view of the stator 11 and the coil 111.

Figure 6:
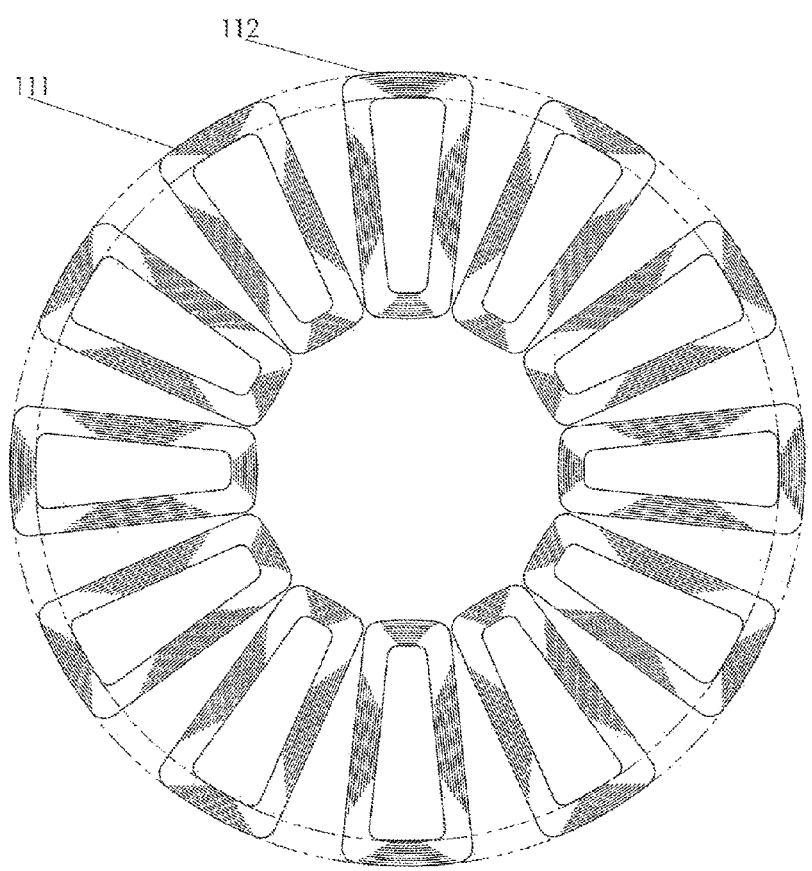
FIG. 6 illustrates the coils and the coil array for the electric motor of the present invention.
Figure 7:
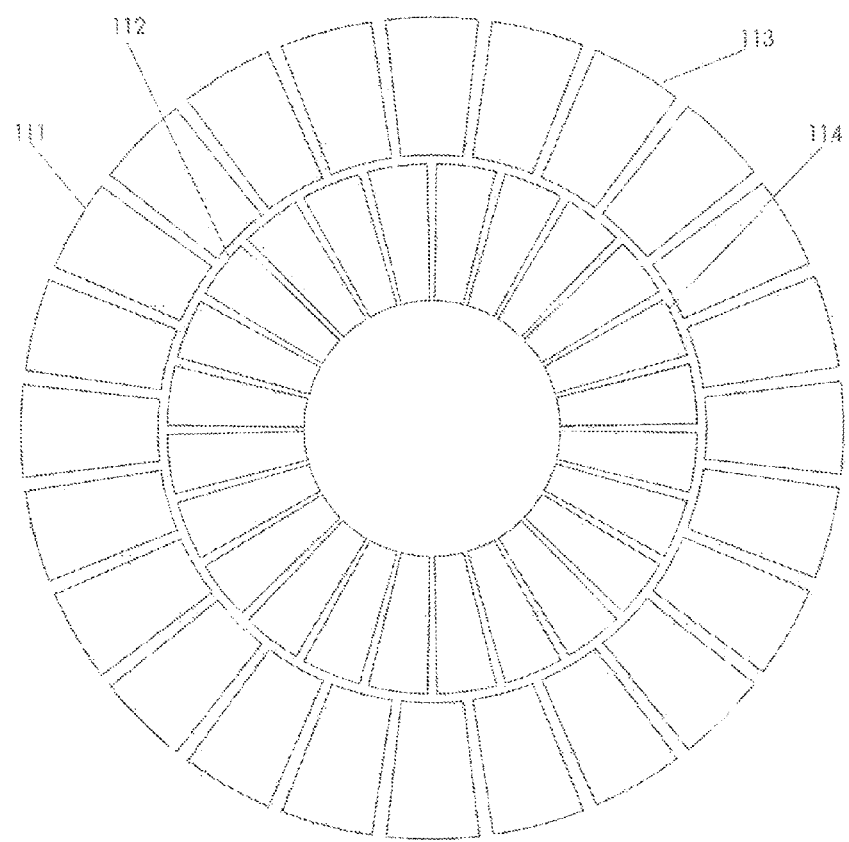
FIG. 7 illustrates inner and outer rings of coils for another schematic drawing of the electric motor of the present invention.

FIG. 6, FIG. 7, FIG. 10A and FIG. 11A show a few type of coils 111, 112, etc. that used on a Disk type motor. FIG. 10 A and FIG. 10 B show coils bended into one side, FIG. 11 A and FIG. 11 B show coils bent into two opposing sides (the middle one keeps straight without bending.) FIG. 6 illustrates a top view of a coil 111 which may be adjacent to a coil 112 which may form a ring of alternating coil 111 and coil 112. The coils 111, 112 may be formed from magnetic wire of the electric motor 10. FIG. 7 illustrates an outer ring of coils 111, 113 and an inner ring of coils 112, 114.

Figure 9:
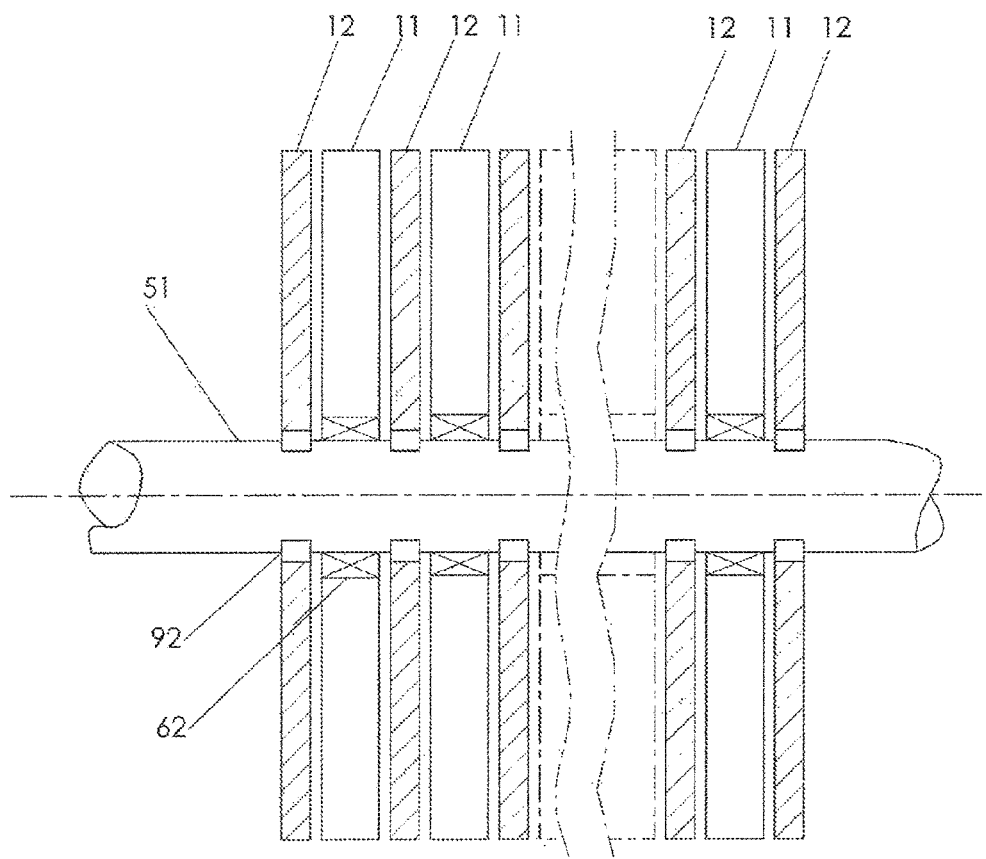
FIG. 9 illustrates a cross-sectional view of another schematic drawing of the electric motor of the present invention.
Figure 10:
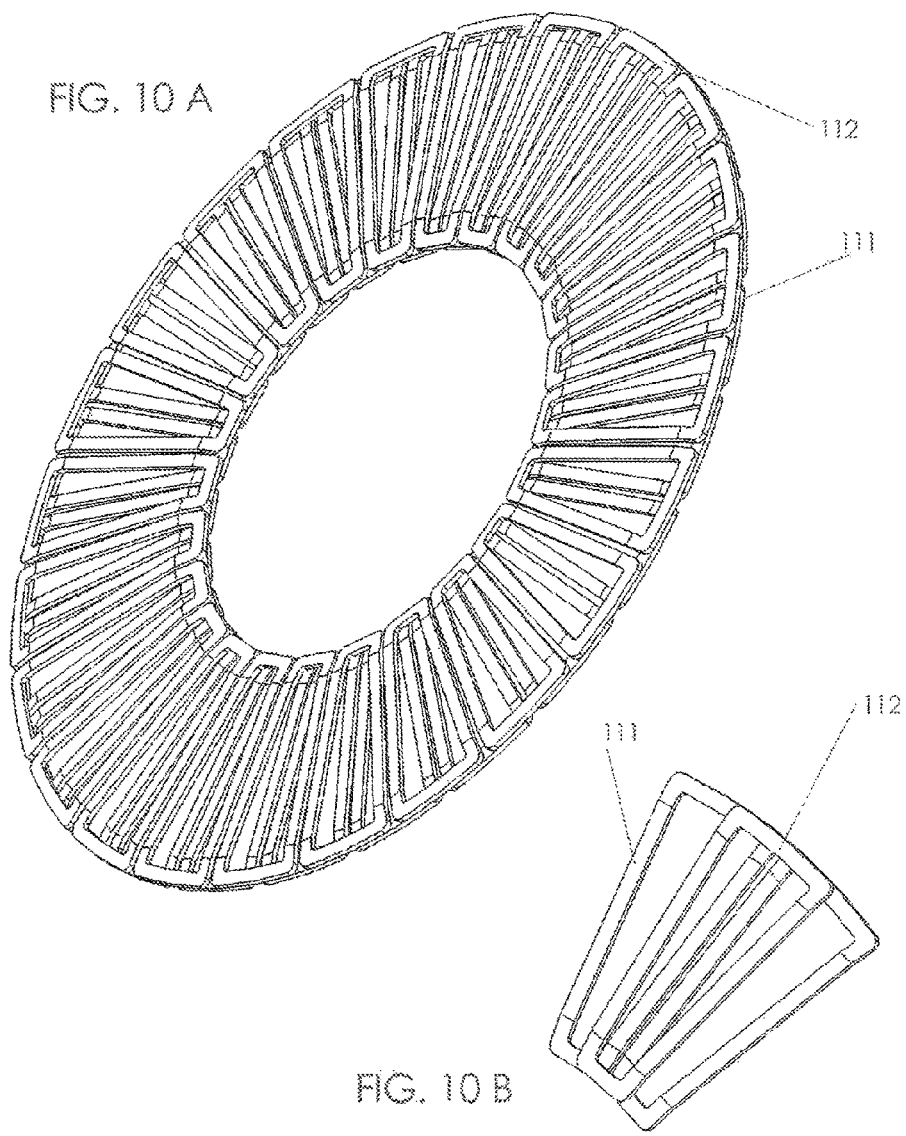
FIG. 10A illustrates a perspective view of the coil of the electric motor of the present invention.
FIG. 10B illustrates a sectional view of the coil of the electric motor of the present invention.
Figures 11A, 11B:
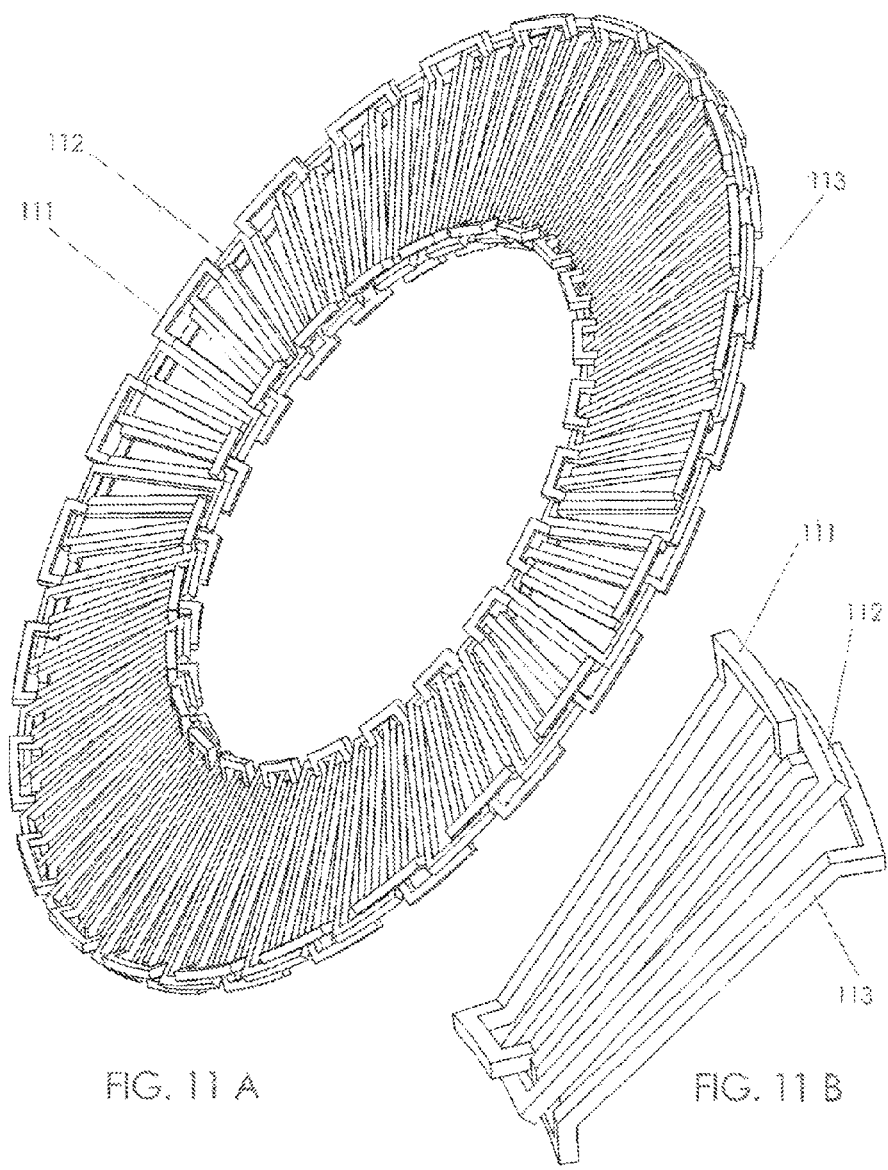
FIG. 11A illustrates a perspective view of the coil of the electric motor of the present invention.
FIG. 11B illustrates a sectional view of the coil of the electric motor of the present invention.

The electric disk motor 10 can be just one layer as shown in FIG. 5C and FIG. 5D, two-layer as shown in FIG. 5A, FIG. 5B, FIG. 8A and FIG. 8B, or three or more layers type as shown in FIG. 9. The stator 11 of such disk type motor may be positioned in the middle of the motor as shown in FIG. 5A, or the stator 11 may be positioned at the sides (two coils) as shown in FIG. 8A and FIG. 8B, or the stator 11 combined with a few coils and few layer type electrical motor 10 as shown in FIG. 9 that may be used especially for start-up, or/and back-up electrical motor 10, which may produce higher torque/force as compared with a single layer type electrical motor on the driven axle 50 that needs to add or deduct smaller amount of driven force when connected with electrical power. Such multi-layer electrical motor arrangement as FIG. 9 may save space on the driving axle.

The smart electrical vehicle 101 may have much higher moving speed (which depending on electrical motor 10 turning speed, and the driving resistance of the vehicle) and may easily control the vehicle maximum moving speed by the motor quantities and the frequency of electrical motor poles that connecting with electrical power. For instance, the police and racing vehicles may have much higher maximum moving speed comparing with a vehicle 101 of a normal user. Also, when driving in reverse, the present invention may reduce the number of connected electrical motors 10 with electrical power and control the frequency of electrical motor turning speed in order to control the maximum reverse driving vehicle moving speed.

The smart electrical vehicle 101 may be much safer compared with the traditional engine fuel driven vehicle with respect to explosion because of the lack of explosive fuel or a reduced amount of fuel inside for the hybrid type. Even the hybrid or pure fuel type of such electrical vehicle 101 may just need to use a small amount of fuel.

Also, the mass center of the smart electrical vehicle 101 may be lower than tradition engine driven vehicle because some or all the batteries 311 may be mounted at the bottom of the vehicle (which is also easy to change the battery 311 when needed). In the alternative, the battery may also be placed inside vehicle such as under the seat, under the hood, or other places of vehicle (see FIG. 12A and FIG. 12B).

When driving this smart electrical vehicle 101 based on the driving requirements such as driving speed, weights, loads, driving resistance, etc., the controller 21 may calculate and operate the optimal needed number of electrical motors 10 that need to connect with electrical power, and the frequency the motor coil pole 111 conducting with the electrical power from the electrical power supply for example such as batteries 311 in order to provide for a smooth ride.

When the smart electrical vehicle 101 makes turns, the controller 21 also can calculate and operate the optimal number of electrical motors 10 that needed to connect the electrical power, and determine in which side of the driven axle 50 based on the angle of turn and other factors in order to obtain no or little sliding of turning.

In order to have longer and smart use of battery 311 in this electrical vehicle 101, the controller 21 periodically may detect the electrical power level in each battery 311, and connects the highest electrical power level battery 311 first, the second highest electrical power battery 311 second, etc. when driving this vehicle 101. When slowing down or braking the vehicle 101, the controller 21 connects the lowest electrical power level battery 311 first, the second lowest electrical power battery second, etc. to charge the least electrical power battery 311 first, the second least electrical power battery 311 second, etc.

If there is a vertical vibration in the vehicle while the vehicle is moving, the present invention may mount a magnetic field on the body of the vehicle and mount the coil on the vibration part such as on the wheel system, or mount the magnetic field on the vibration part such as on the wheel system and mount the coil on the body of the vehicle, which may allow the coil to cut the flux lines of the magnetic field and in return to generate electricity. (see FIG. 20A, FIG. 20B, FIG. 20C, FIG. 20D). In this way, the mechanical vibration energy may be converted into electrical energy and charge back to the battery 331.

FIG. 3B illustrates a motor 10 carried by the body of a vehicle 412. FIG. 12A illustrates positioning of the battery/batteries inside & under the seat and/or hood of the vehicle. FIG. 12B illustrates positioning of the battery/batteries outside of the vehicle body, such as attached to the bottom. FIG. 15B illustrates a laminated rotor 121. FIGS. 17A, 17B and 17C illustrate alternative motorcycle frames 413 affixed to tires 72. FIG. 18B illustrates fins 414 attached to motor rotors 12. FIG. 20A illustrates opposed concentric semi-cylindrical magnetic field poles 400 and 401 with an electrical coil 111 cutting lines of flux 402 extending there between. FIG. 20B illustrates opposed (north and south) flat poles 403 and 404 having flux lines 405 extending there between forming a magnetic field 406. FIG. 20C illustrates a cylindrical magnetic field pole 407. FIG. 20D illustrates opposed vertical flat poles 408 and 409 and opposed horizontal flat poles 410 and 411.

Of course, the electrical vehicle 101 may include voice recognition, finger or palm recognition, face recognition, eye recognition, password or pin number recognition, or other thief-stop device to protect the electric vehicle 101 from being stolen.

- 10 - - - electrical motor; 11 - - - stator of an electrical motor;
- 12 - - - rotor of an electrical motor;
- 21 - - - controller (to control the motor on/off and the frequency of coil energized);
- 31 - - - battery unit; 41 generator or alternator; 50, 51, 52, 53, 54 - - - driving axle;
- 61 - - - universal joint, u-joint cv-joints, differential system;
- 62 - - - bearing;
- 71 - - - wheels; 81 - - - universal axle; 90 - - - transmission system;
- 91 - - - gear; 92 key; 93 - - - electrical motor cover;
- 103 - - - electrical drive system; 111, 112, 113, 114 - - - coil of electrical motor;
- 121 - - - rotor sheet; 311, 312, 313 - - - battery;

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. An electric vehicle, comprising:
a first drive axle drivingly engaging a first wheel of the electric vehicle;
a first electric motor mounted directly on the first drive axle;
a battery unit that powers the first electric motor;
a controller to control the electric motor;
wherein the first electric motor comprises a plurality of electric motors, and wherein each of said plurality of electric motors is connected to said battery unit;
wherein the controller controls the first electric motor based upon operator demand, vehicle speed, driving resistance, wind resistance, and vehicle weight;
wherein the controller controls the plurality of electric motors to have the same rotor rotational speed;
and wherein the electric motor includes a dirt excluding seal cover.

2. The electric vehicle of claim 1, wherein the electric vehicle further comprises a second drive axle to drive a second wheel of the electric vehicle, and at least one second electric motor mounted directly on the second drive axle.

3. The electric vehicle of claim 1, wherein the electric vehicle is a hybrid electric vehicle combined with a fuel engine driven generator/alternator and said battery unit to provide electricity for the electric motor; and wherein the electric vehicle is a pure fuel type electric motor vehicle without batteries that power the electrical motors.

4. The electric vehicle of claim 1, wherein the electric vehicle comprises one of a front drive; a rear/back drive; or a four-wheel-drive.

5. The electric vehicle of claim 1, wherein the electric vehicle comprises one of a car, a van, a SUV, a pickup, a train, a boat, a ship, a yacht, a marine vehicle, a submarine, an airplane, a helicopter, a bus, a truck, a snowmobile, a fire engine, an ATV, an RV, a tractor, a motorcycle, a scooter, a three wheel vehicle, an off-highway construction mobile vehicle, a bicycle, a bike, an amphibious vehicle, or a mowing machine.

6. The electric vehicle of claim 1, wherein the battery unit comprises of batteries, and wherein the battery unit is disposed interior to the electric vehicle.

7. The electric vehicle of claim 1, wherein the electric motor comprises part of a wheel system of the vehicle.

8. An electric vehicle of claim 1, wherein the electric motor includes a rotor which rotates about an axis perpendicular to an axis of rotation of the wheel and drivingly engages the wheel through a mechanical gear transmission.

9. An electric vehicle of claim 1, wherein said first electric motor is powered by a fuel engine driven generator/alternator that generates electricity.

10. An electric vehicle of claim 1, wherein the electric vehicle is a high performance emergency vehicle including an engine operable to provide high moving speed.

11. An electric vehicle of claim 1, wherein the battery unit comprises a plurality of batteries, and wherein the battery unit is disposed exterior to the electric vehicle.

12. An electric vehicle, comprising:
a first drive axle drivingly engaging a first wheel of the electric vehicle;
a plurality of electric motors, each electric motor including a rotor mounted directly on the first drive axle for axial rotation therewith;
a battery unit operative to power each of the plurality of electric motors; and
a controller operable to control the plurality of electric motors,
wherein the controller varies rotor rotational speed the plurality of electric motors as a function of operator demand, vehicle speed, driving resistance, wind resistance and vehicle weight,
wherein the rotational speed of all of the rotors vary in unison as a function of operator demand, and
wherein each electric motor includes a stator and a seal cover enclosing at least one associated rotor operative to exclude ambient dirt from said associated motor.

13. The electric vehicle of claim 12, further comprising:
a second drive axle drivingly engaging a second wheel of the electric vehicle; and
a second plurality of electric motors, each second electric motor including a rotor mounted directly on the second drive axle for axial rotation therewith,
wherein the battery unit is operative to power each of the second plurality of electric motors,
wherein the controller is operable to control each of the second plurality of electric motors,
wherein the controller is operable to vary rotor rotational speed of each of the second plurality of electric motors as a function of operator demand, vehicle speed, driving resistance, wind resistance and vehicle weight,
wherein the rotational speed of all of the rotors of the second plurality of electric motors vary in unison as a function of operator demand, and
wherein each electric motor of the second plurality of electric motors includes a stator and a seal cover enclosing at least one associated rotor operative to exclude ambient dirt from an associated motor.

14. The electric vehicle of claim 13, wherein the electric vehicle further comprises a third drive axle drivingly interconnecting said first and second drive axles, said third axle operative to transmit torque produced by the first plurality of electric motors to the second axle and operative to transmit torque produced by the second plurality of electric motors to the first axle.

15. The electric vehicle of claim 14, wherein the electric vehicle further comprises a third plurality of electric motors, each third electric motor including a rotor drivingly engaging the third drive axle for axial rotation therewith and operative to transmit torque to at least one of said first drive axle and said second drive axle.

16. The electric vehicle of claim 14, wherein the third drive axle is drivingly interconnected to at least one of said first drive axle and second drive axle through an intermediate mechanical transmission.

17. The electric vehicle of claim 16, wherein the intermediate mechanical transmission is a gear driven speed changing transmission.

18. The electric vehicle of claim 15, wherein each third electric motor includes a stator and a seal cover enclosing at least one associated rotor operative to exclude ambient dirt from said associated motor.

19. The electric vehicle of claim 12, wherein the electric vehicle is a hybrid electric vehicle combined with a generator/alternator driven by a fuel type engine which, in addition to the said battery unit, provides electricity for the plurality of electric motors.

20. The electric vehicle of claim 12, wherein an associated rotor of at least one of said plurality of electric motors concentrically supports an electric vehicle ground engaging tire for rotation therewith about the first drive axle.

\* \* \* \* \*